Oct. 9, 1962     E. SPINGIES ETAL     3,058,094
ARRANGEMENT FOR DETERMINING TABULAR VALUES
Filed Jan. 17, 1957     12 Sheets-Sheet 1

| 240 | 241 | | | |
|---|---|---|---|---|
| Nr.1 | M3-2y | M4-2y | M5-2y | M6-3y |
| Nr.2 | M3-4y | M4-4y | M5-4y | M6-5y |
| Nr.3 | 4-3y | 6-3y | 8-4y | 10-4y |
| Nr.4 | 4x12-5y | 6x15-6y | 8x20-7y | 10x25-7y |
|  |  |  |  |  |

|  | 243 |
|---|---|
| Nr.20 | 15,83 |
| Nr.21 | 16,76 |
| Nr.22 | 17,53 |
| Nr.23 | 18,41 |
| Nr.24 | 19,53 |

INVENTORS
E. Spingies + H. Rose
By Lowry & Rinehart
ATTYS.

Oct. 9, 1962 E. SPINGIES ETAL 3,058,094
ARRANGEMENT FOR DETERMINING TABULAR VALUES
Filed Jan. 17, 1957 12 Sheets-Sheet 2

INVENTORS
E. Spingies & H. Rose
By
Lowry & Rinehart
ATTYS.

INVENTORS
E. Spingies
& H. Rose
By
Lowry & Rinehart
ATTYS.

Oct. 9, 1962

E. SPINGIES ETAL 3,058,094

ARRANGEMENT FOR DETERMINING TABULAR VALUES

Filed Jan. 17, 1957

INVENTORS
E. Spingies
& H. Rose
By
Lowry & Rinehart
ATTYS.

INVENTORS
E. Spingies & H. Rose

United States Patent Office 3,058,094
Patented Oct. 9, 1962

3,058,094
ARRANGEMENT FOR DETERMINING TABULAR VALUES
Erwin Spingies, 30 Hochallee, Hamburg 13, Germany, and Herbert Rose, 9 Eichenallee, Wohltorf, Lauenburg, Germany
Filed Jan. 17, 1957, Ser. No. 634,764
Claims priority, application Germany Jan. 26, 1956
6 Claims. (Cl. 340—147)

It is well known in the art to store and recover, when required, tabular values in perforated cards or by magnetic recording. In the case of perforated cards a special perforated card must be provided for every characteristic.

For recovering constant co-efficients or values, the necessary perforated cards must be sorted out and added to the receiver card and then again sorted out after the desired constant values have been taken. In the case of magnetic recording, the marked place must move up to a scanning or sensing head.

It is an object of the present invention to provide a new and useful arrangement for determining tabular values, in which the arrangement complicated supplementary work for recovering the tabular constant values is simplified and the constant values are immediately available by being electrically set according to a pre-arranged circuit in a constant value transmitter. To each constant value a certain switching point is assigned which switching point is operated through the intermediary of an input part by prescribed characteristics or groups of characteristics successively or simultaneously. Each switching point automatically releases a number of current impulses or a control voltage, corresponding to the value of the switching point, successively or simultaneously via switching paths connected in series in an outlet part.

The input part of the constant value transmitter can, for example, be controlled by the keyboard of a calculating machine or typewriter. Similarly, the output part of the constant value transmitter can serve for controlling calculating machines or bookkeeping machines.

Besides step-by-step selectors, the constant value transmitter comprises dials, counter magnets, counter tubes, and the like. The input part controls, according to value, the output part by means of switch paths set by current valves. Each contact of the input selectors corresponds to a switching point for a constant value.

The switching operations in the constant value transmitter are controlled, after the input value has been entered, substantially by current impulses from condenser discharges. Each switching point corresponding to an introduced characteristic receives voltage only after it reaches its switching position through the intermediary of a control relay of the excited selector. The number of switching paths of the switching points corresponds at least to the highest number of digits of the constant value.

A condenser in the input part controls the output part, and another condenser in the output part controls the value release. Additional groups of selectors can be series-connected to the input selectors in order to increase the number of the switching points for the constant values. In the case of groups of selectors connected in series, a condenser on the input side controls these groups, and another condenser is arranged for releasing the output part.

The selectors of the input and/or output part are assembled as co-ordinates or groups of co-ordinates. The co-ordinate points of the constant value provided in the input part are preferably combined in groups. The output part can be selectively switched over to impulse or control voltage transmissions for transmitting the constant values.

The constant value transmitter can be used with advantage for determining tabular values (constant values) for calculating salaries and wages, materials, determining prices, mathematical calculation, statistics, mileage rates for the transport industry and so forth. At the same time it is also possible to determine constant values for several purposes, so that they are available for selection for the actual purpose for which they are required. Several machines which may be set up a distance apart can be connected up to a constant value transmitter for transmitting constant values.

The preferred embodiments of the invention are illustrated by way of example in the accompanying drawings.

Figure 8:
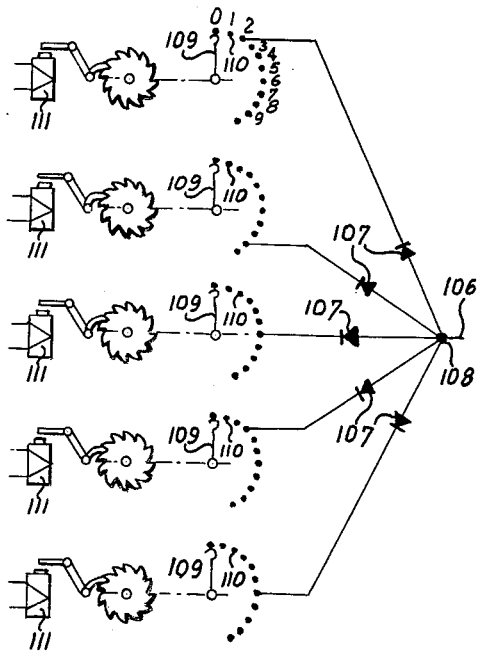

FIG. 8 is a value diagram from a switching point to the output part according to the unit-type connecting diagram of FIG. 7, and FIGS. 9 to 16 show a circuit diagram of a constant value transmitter for taxes and social security contributions. These FIGURES 9 to 16 are divided into two groups, the first of which groups includes FIGS. 9 to 12, and the second group FIGS. 13 to 16, which groups supplement each other when their outer dot-dash lines I—V or VI—IX, respectively, are placed one on the other.

Figures 1, 3, 5:
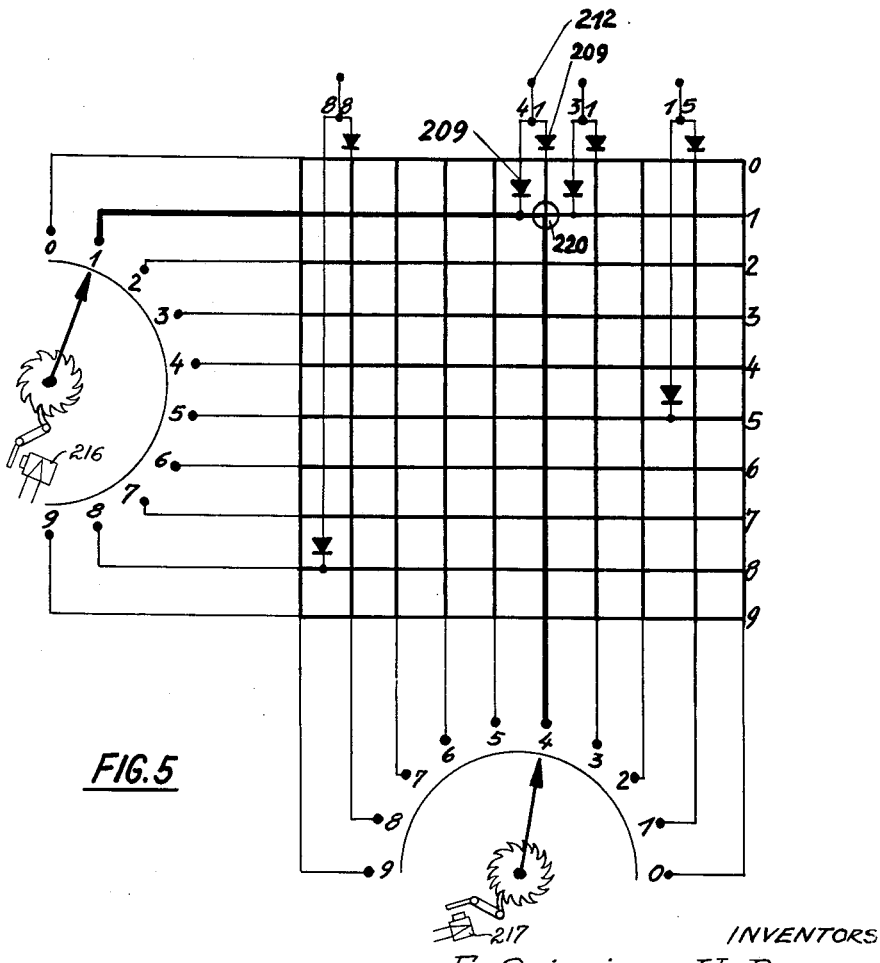
FIG. 1 shows a table for material prices.
FIG. 3 shows another table for material prices.
FIG. 5 illustrates diagrammatically a co-ordinate matrix of the output part of a constant value transmitter according to the invention.

In order to explain the constant value transmitter according to the invention in a simple manner a table is illustrated in FIG. 1, having columns 240 and 241 and only one place input and output values. In column 240 the kinds of material and the actual stock numbers are indicated. Each kind of material comprises several sizes with different piece prices y which are entered in the columns 241. It will be possible to retrieve the price from the constant value transmitter after introducing the material stock number for the actual size.

The material stock number is introduced electrically into the constant value transmitter. The constant values are electrically determined by suitably switching the input and output parts. The input values can also be introduced by remote operation and the constant values transmitted to the remote control.

Figure 2:
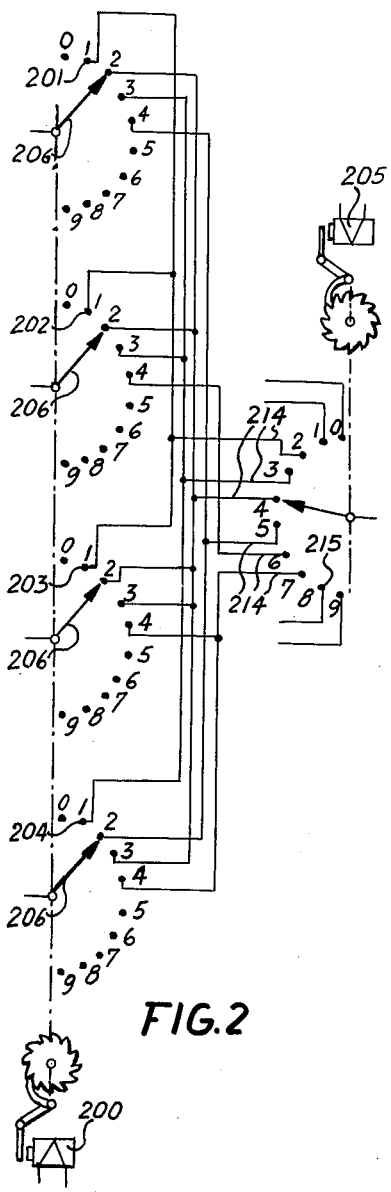
FIG. 2 is a schematic diagram of a circuit for calculating prices of material according to FIG. 1.

A schematic diagram for the calculation of material, according to FIG. 1, is illustrated in FIG. 2. The input part consists of a step-by-step selector 200 with four contact paths 201 to 204. To each of the contact paths 201 to 204 a stock size for the same type of material is co-ordinated (constant value from the table). Circuits 214 lead from the contact paths 201 to 204 to a step-by-step selector 205 forming the output part. The step-by-step selector 205 has a contact path 215 with contacts each of which corresponds to a constant value from the table. This value can either be rendered visible or by picking up control voltages or impulses be used for the remote control of other apparatus.

If, for example, it is desired to transmit the constant value for screws, the corresponding stock number 2 is introduced into the input part. This causes the step-by-step selector 200 to move all its switch arms 206 on to the second contact. The corresponding contact path of the contact paths 201 to 204 is selected according to the size of screw, for example the group of contact path 203 in the case of screws M5. The second contact of the contact path 203 is connected with the fourth contact of the contact path 215 of the output part 205, so that this electrically transmits the size 4 of the table.

In FIG. 3 an extended example of a table with material stock numbers of more than one place in a column 242 and with multiple place constant values (prices) in a column 243 is shown.

Figure 6:
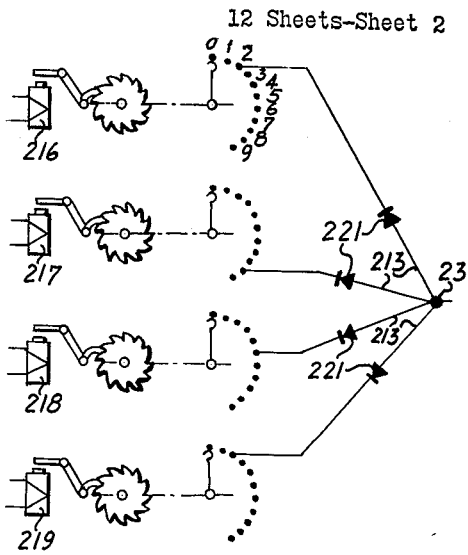
FIG. 6 shows diagrammatically the value transmission from a switching point to the output part.
Figure 4:
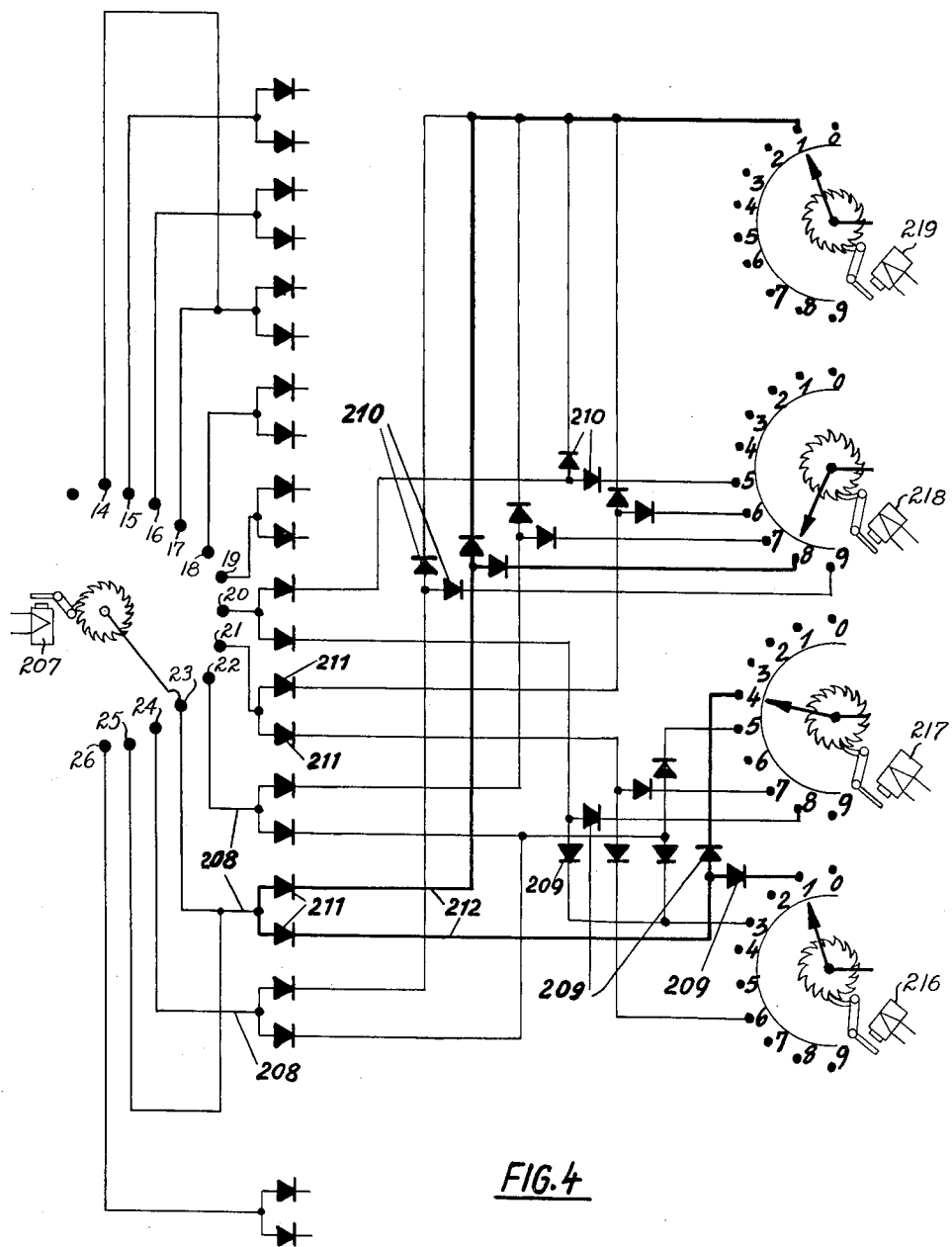
FIG. 4 is a schematic diagram of a circuit for calculating the material according to FIG. 3.

FIG. 4 shows the supplementary schematic diagram for the representation of these prices. A step-by-step switching mechanism or selector 207 with a plurality of contacts is chosen. If the identification number 23 for representing according to cost is dialled in this step-by-step selector, a switching path is established by a contact associated with this identification number 23, via a circuit 208 to four step-by-step selectors 216 to 219, because the initial number (price) 18.41 is a four-place figure. Normally four circuits 213 (FIG. 6) must lead from the contact associated with the identification number 23 to the contacts of the step-by-step selectors 216 to 219, representing the price. As the contacts representing the price will also be repeatedly energized by other identification numbers, it is necessary, in order to avoid shor-circuiting, to provide diodes 211 in each circuit. The large number of diodes can be reduced if each two step-by-step selectors, for example, 216 and 217 for cent units and tens, and two step-by-step selectors, for example, 218 and 219 for dollar units and tens, are connected in groups via diodes 209 and 210. As the contacts of the step-by-step selector 207 are multiple connected with the contacts of the step-by-step selectors 216 to 219, diodes 211 are inserted in the circuits 208. The uniting of the step-by-step selectors 216 to 219 in groups of two then enables the number of diodes to be reduced.

FIG. 5 shows the assembly of the step-by-step selectors 216+217 and 218+219 into respective groups, that is each to a co-ordinate.

In the case of a large number of different kinds of material, that is identification numbers, the connections of each two step-by-step selectors 216+217 are connected into one co-ordinate circuit of ten times ten connections. A circuit 212 extends from each material number via two diodes 209 to a co-ordinate point 220, which is connected with a contact of each of the step-by-step selectors 216+217 of the output part and represents the cent amount of the example 18.41.

The type of the two examples shows that, according to the desired number of kinds and the number of the different groups of material, a suitable circuit arrangement must be chosen. Input entities with corresponding constant value can be connected up in the circuits 208.

Associated entities, such as occur for example in the tax tables (tax on wages, church tax, emergency tax), can be repeated successively with pre-set control as constant values by automatic switching steps. These tables are so drawn up that the cent units and tens and the dollar units of the taxes can be assembled into groups which repeatedly recur in the hundred dollar amounts, and to these groups certain step-by-step selectors can be co-ordinated in order to switch the hundred dollar amounts on to certain contact paths of these selectors.

Figure 7:
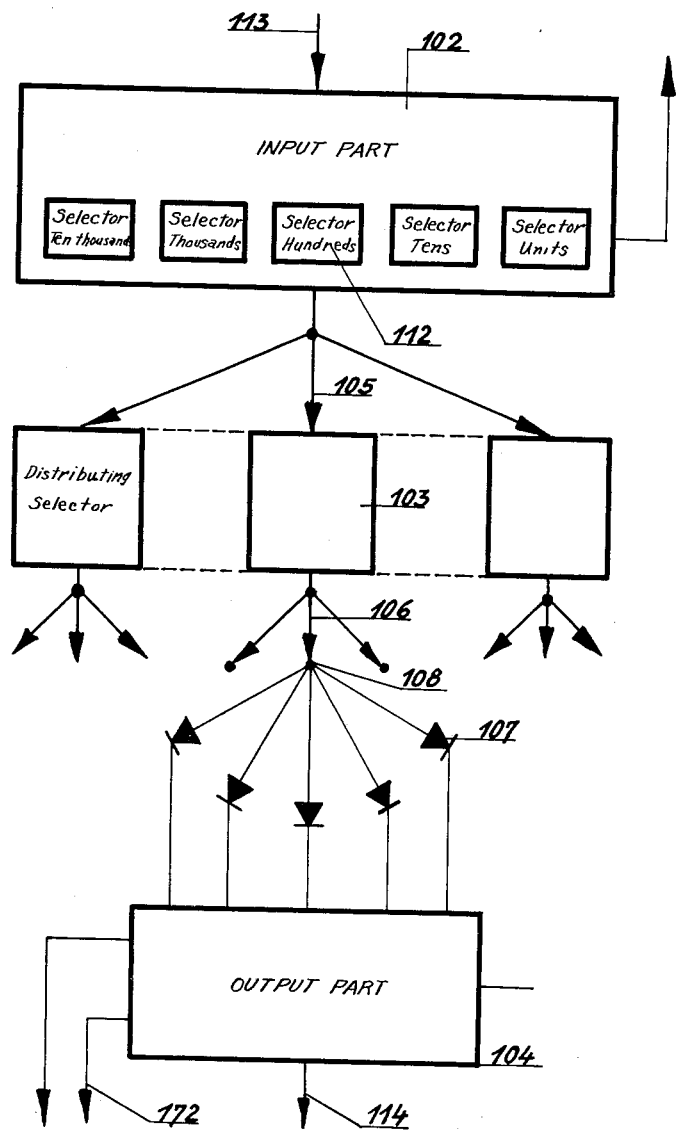
FIG. 7 is a block and schematic diagram of a constant value transmitter for taxes and social security contributions.

A switching diagram for a constant value transmitter for taxes and social contributions is shown in FIG. 7. The constant value transmitter has an input part 102, distributing selectors 103 and an output part 104. The input part 102 comprises step-by-step selectors 112 or dials, stroke rotary selectors, motor rotary selectors, counter magnets, and counter tubes, which are connected by circuits 105 to the distribution selectors 103, from which switching paths 106 lead to switching points 108.

Each switching point 108 is associated with a certain wage for which the tabular value is to be ascertained. Conduits lead from the switching points 108 via diodes 107 to contacts 109 of contact paths 110 (FIG. 8) of step-by-step selectors 111 of the output part 104. There are as many step-by-step selectors as places in the tabular value.

The control voltages representing a wage amount reach the input part 102 of the constant value transmitter through a circuit 113. Thus the step-by-step selectors 112 of the input part 102 are brought into the switching position corresponding to these control voltage values. The step-by-step selectors 112 energize the corresponding distribution selector 103 through the intermediary of the selected circuit 105. The distribution selector 103 then applies the voltage through the switching path 106 to the switching point 108 which corresponds to the tabular value corresponding to the wage amount introduced. The voltage applied to the switching point 108 passes through the diodes 107 to the contacts 109 of the contact paths 110 of the step-by-step selectors 111 of the output part 104. At the same time the step-by-step selectors 111 are, as hereinafter described, released and move over as many steps as are necessary until they have reached the energized contact 109 of their co-ordinated contact path 110. The arms 109 of the step-by-step selectors visibly indicate the table value by their position. The impulses imparted by the step-by-step selectors 111 until they reach the contact 109 can also be transferred through a circuit 114.

Instead of passing on current impulses through the circuit 114 it is also possible to pass on control voltages through another contact path of each step-by-step selector 111.

The operation of the constant value transmitter is described with the aid of an example, illustrated in FIGS. 9 to 16, for a wage amount of $357.20 with the social security contribution of $46.17 and an additional contribution of $0.00.

Figure 10:
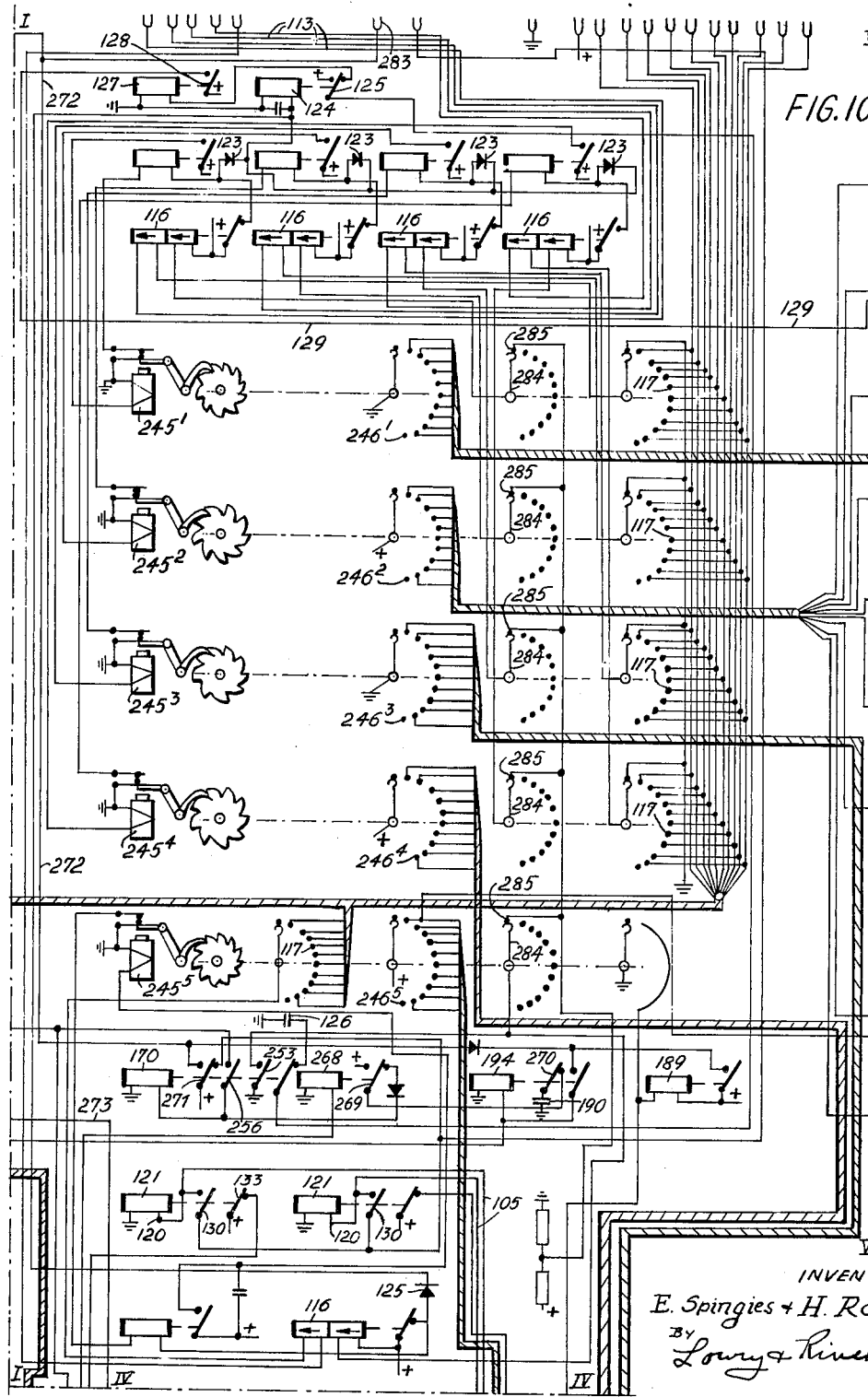
Figure 11:
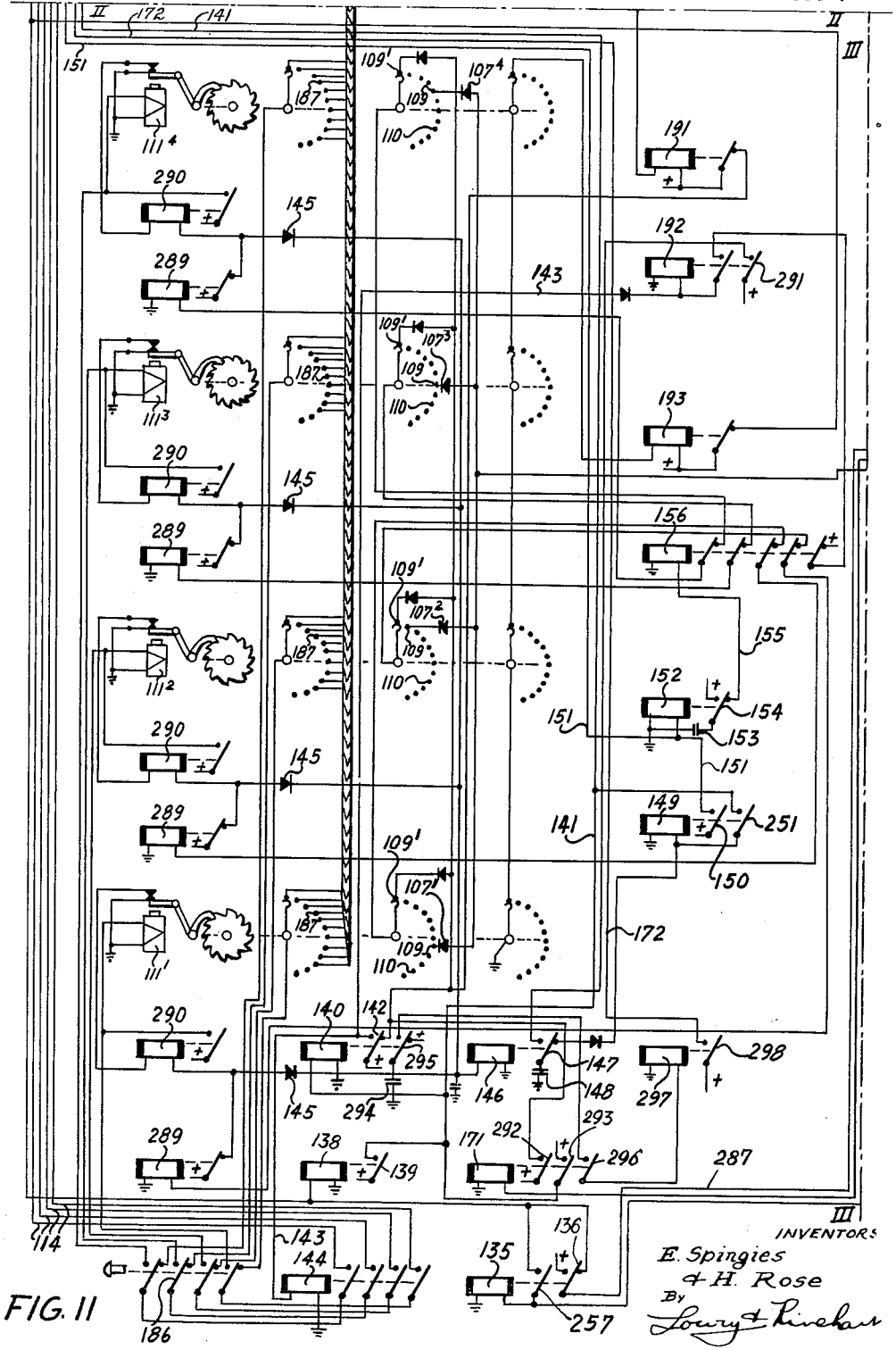

If, for example, the wage amount of $357.20 is introduced into the constant value transmitter as a control voltage, through the circuits 113 by a calculating machine, relays 116, FIG. 10, will respond. Relays actuated by voltage control are shown in U.S. Patent 2,542,-998. They operate, in known manner, step-by-step selectors $245^1$ to $245^5$ which move their switch arms on contact paths 117. Upon the insertion of the value 357.20 the step-by-step selector $245^5$ runs on to 3, the selector $245^4$ on to 5, the selector $245^3$ on to 7, the selector $245^2$ on to 2, and the selector $245^1$ on to 0.

Several constant values, for example taxes in several classes, are provided in the constant value transmitter for each wage amount. As the wage amounts are divided into groups, for the example chosen all wage amounts from $353.09 to 357.24 correspond to one single tax and social contribution group, and a common switching point 108 for each tax class and social contribution group can be provided for values between these amounts.

The usual tax tables and the tables for social security contributions are so divided into ranges that the cent amounts, the dollar units amounts and the dollar tens amounts recur in each hundred place.

By dividing the table in this manner it is possible to incorporate wage amounts from $0.00 to $99.99 with 26 distribution selectors 103.

Figure 15:
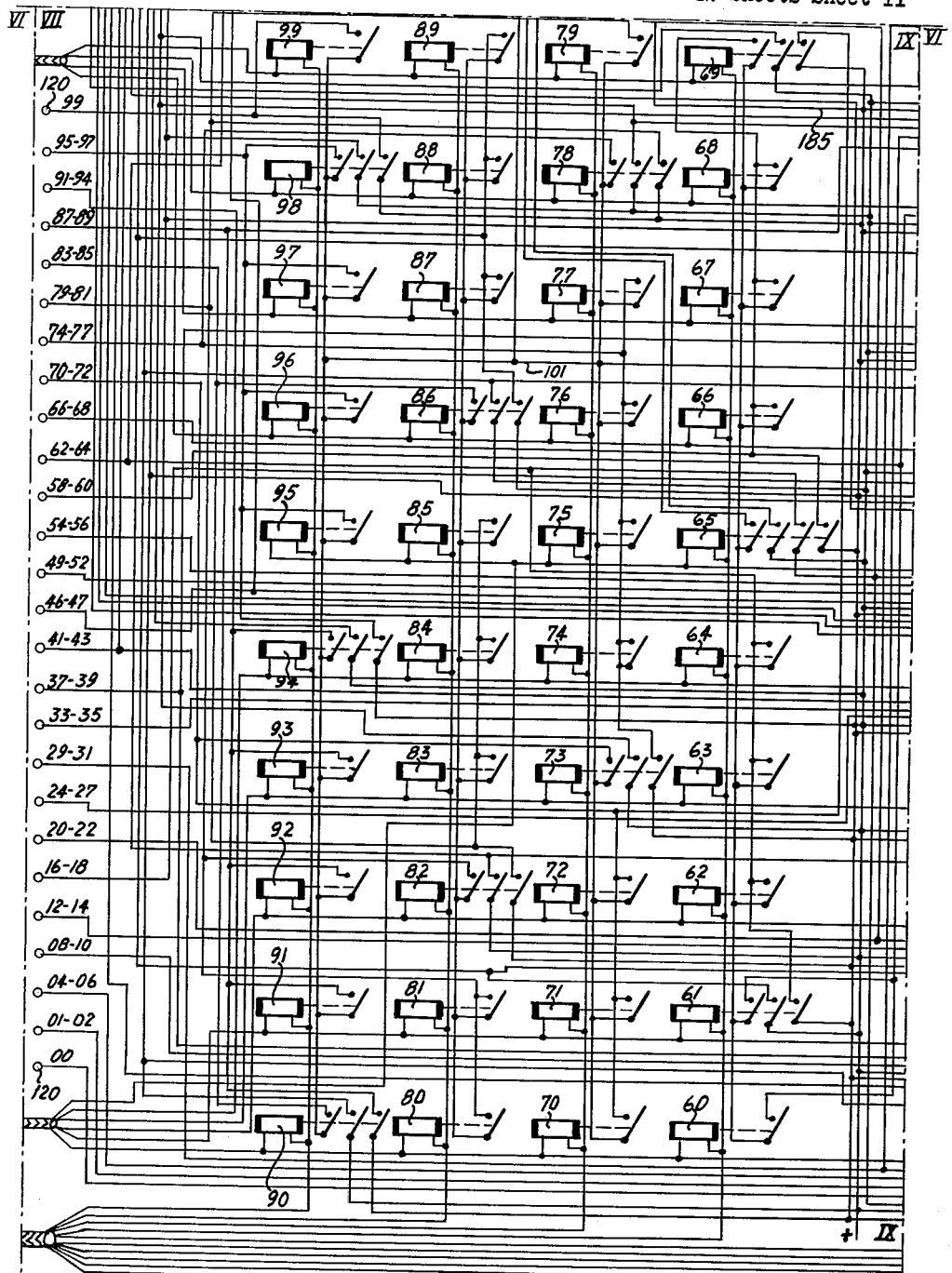
Figure 16:
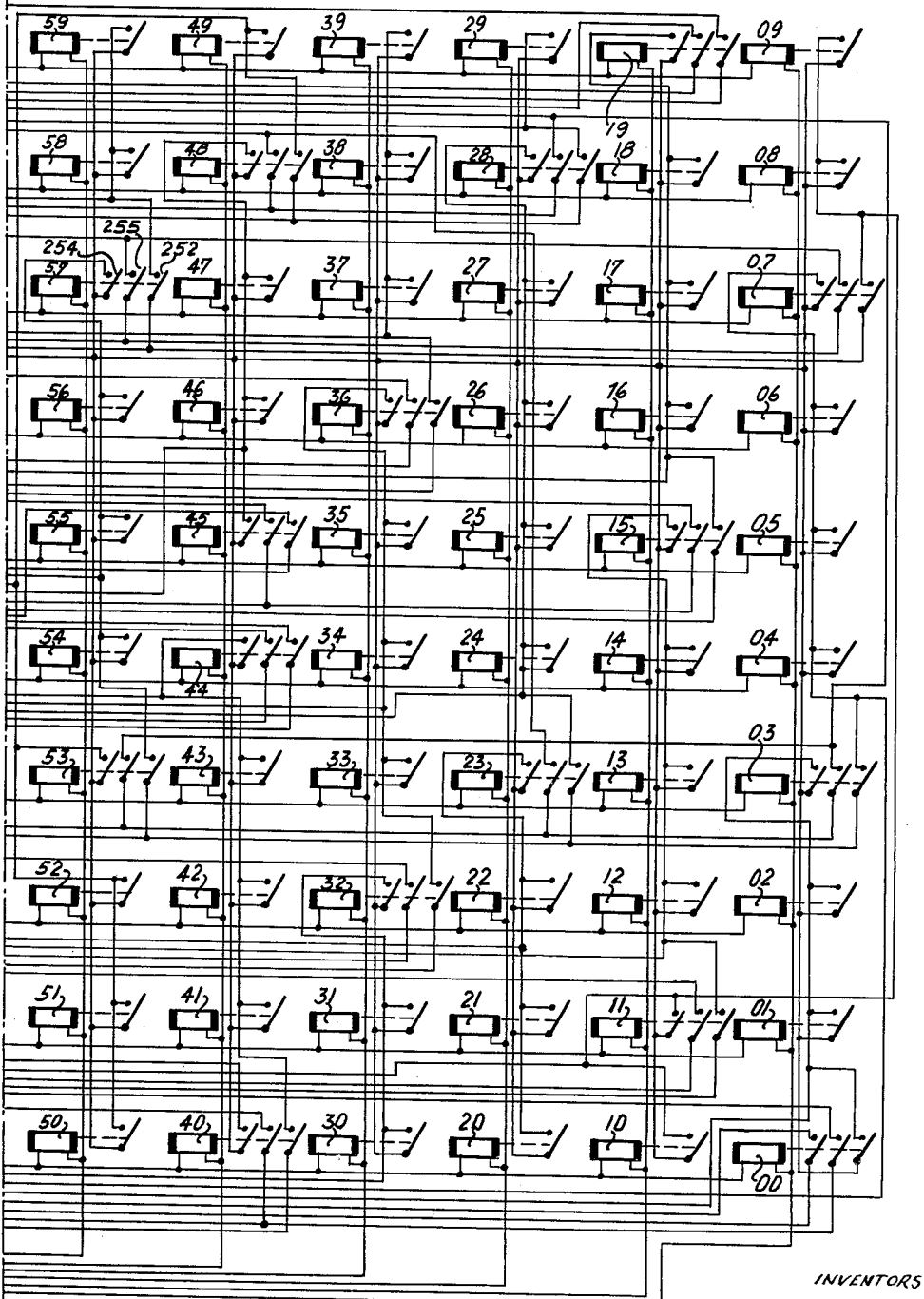

Each of the step-by-step selectors $245^1$ to $245^4$ has another contact path $246^1$ to $246^4$, respectively. The switch arms of these contact paths control, through the contact paths $246^1$ and $246^2$ (FIGS. 13 and 14), relays for the cent amounts from 00 to 99. Similarly the dollar units and tens amounts from 00 to 99 (FIGS. 15 and 16) are controlled by relays through the contact paths $246^3$ and $246^4$ (FIGS. 15 and 16).

In a tax table the cent amounts are often divided into eight groups, namely from 01 to 08, 09 to 24, 25 to 41, 42 to 58, 59 to 74, 75 to 91, 92 to 99 and 00 to 01.

These eight groups of cent amounts belong to certain dollar amounts, in the example:

Group 01–08 to $3, 28, 53, 78
Group 09–24 to $7, 32, 57, 82
Group 25–41 to $11, 36, 61, 86
Group 42–58 to $15, 40, 65, 90
Group 59–74 to $19, 44, 69, 94
Group 75–91 to $23, 48, 73, 98
Group 92–99 to $3, 28, 53, 78
Group 00–01 to $3, 28, 53, 78 and the relays of one group of the dollar amounts carry out the deciphering of the cent relay groups. In the cent relay groups which extend over a greater range than a decade, the whole decade can be dealt with by one relay, for example 10 to 19, 30 to 39, 60 to 69 and 80 to 89.

The contacts of the cent groups from 00 to 99 are practically short-circuited by the rest contacts of the relays 131 and $131^1$. In the example chosen dollar relay 57 (FIG. 16) responds and transmits through a contact 255 a switching voltage to a relay 24–25 (FIG. 13) of a relay group 131 and at the same time through a diode to a relay $131^1$. Both relays open and thus divide the cent amount of 00 to 99 into the groups 00 to 24 and 25 to 99. The current impulse switched by a relay 127 (FIG. 10) through a circuit 129 can act via the relay 20 (FIG. 14) of the group of relays for the cent amounts in the range of 00 to 24 of the split cent amount. Through a circuit 101 (FIG. 15) and a contact 254 of the relay 57 of the group of dollar relays, the current impulse reaches the connection 54–56 of connecting points 120 through the circuit 105. If the cent amount were to fall in the group 25–99, the current impulse via a circuit 185 and a contact 252 of the relay 57 of the dollar amounts would reach the connection 58–60 of the connecting points 120.

Each connecting point of the connecting points 120 comprises a circuit 105 and a relay 121 (FIG. 10), which energizes the distribution selector 103 co-ordinated to it. The distribution selector 103 continues to move until the switch arm 247 of a contact path 122 reaches the contact energized by the step-by-step selector $245^5$ via the contact path $246^5$. In the example chosen the distribution selector 103 represents the hundreds amount.

On the running in of the selectors $245^1$ to $245^5$ a relay 124 is energized via rest contacts of the relays 116 via diodes 123. The relay 124 charges a condenser 126 via a switch-over contact 125 and a rest contact of a relay 170. After running in of the selectors $245^1$ to $245^5$ the relays 116 open their contacts and the relay 124 releases. Contact 125 now transmits the charge of the condenser 126 to the relay 127 which temporarily responds and closes its contact 128. Via contact 128 and circuit 129 plus voltage is applied to a contact of the relay 20.

After the energization of the relay 121 a contact 133 will be opened which switches off from the contact path 122 of the distribution selector $103^1$ the holding voltage arresting the selector in its initial position. The contact arm 247 becomes dead so that a relay 260 releases. An appertaining contact 261 applies a voltage to a relay 262 which closes its contact 263 and applies voltage to the driving magnet of the distribution selector $103^1$ via a contact 264 of the relay 260. The energized armature opens an appertaining contact 265 which switches off the minus voltage from the relay 262 and opens the contact 263 thereof. Upon the energization of the armature the distribution selector $103^1$ has made one switching step. This action is repeated until the switch arm 247 has reached a contact of the contact path 122 of the distribution selector $103^1$, which contact is acted upon by the hundreds selector $245^5$ via the switch arm $246^5$ thereof. The switch arm 247 now picks up this voltage and causes the relay 260 to respond which opens the contacts 261 and 264 and therewith stops the selector $103^1$. At the same time the contact 261 switches on, during the running in of the distribution selector $103^1$, a relay 268 which charges a condenser 190 via its contact 269 and a contact 270 of a relay 194. Upon the running in of the distribution selector $103^1$ being completed, the contact 261 of the relay 260 switches off the relay 268, so that the condenser 190 discharges its charge via the contact 270 of the relay 194 and the inoperative contact 269 of the relay 268 to the relay 170 and causes same to respond. The relay 170 holds itself via its contact 256. A contact 271 of the relay 170 applies voltage via a circuit 272 to a contact 283 of the input plug of the input part 102. By this voltage, in the calculating machine connected up, the control voltages for the value transmission via the circuits 113 are interrupted, so that the relays 116 of the input selectors $245^1$ to $245^4$ will release and keep these selectors in operation until switch arms 284 will have reached contacts 285. Now current can flow from the positive pole to a negative voltage potential via a winding of the relays 116 and via the appertaining switch arms 284 and the contacts 285, so that these relays 116 pull up and open their contacts. The selectors $245^1$ to $245^4$ have reached their initial position. The relay 116 of the selector $245^5$, however, receives minus voltage on its winding via a contact 253 of the relay 170 so that it cannot release and the selector $245^5$, which represents the input value characterizing 100 dollars, is arrested in its position. The contact 271 of the relay 170 switches off also the holding voltage to the relays 121 so that these, too, can release.

Figure 12:
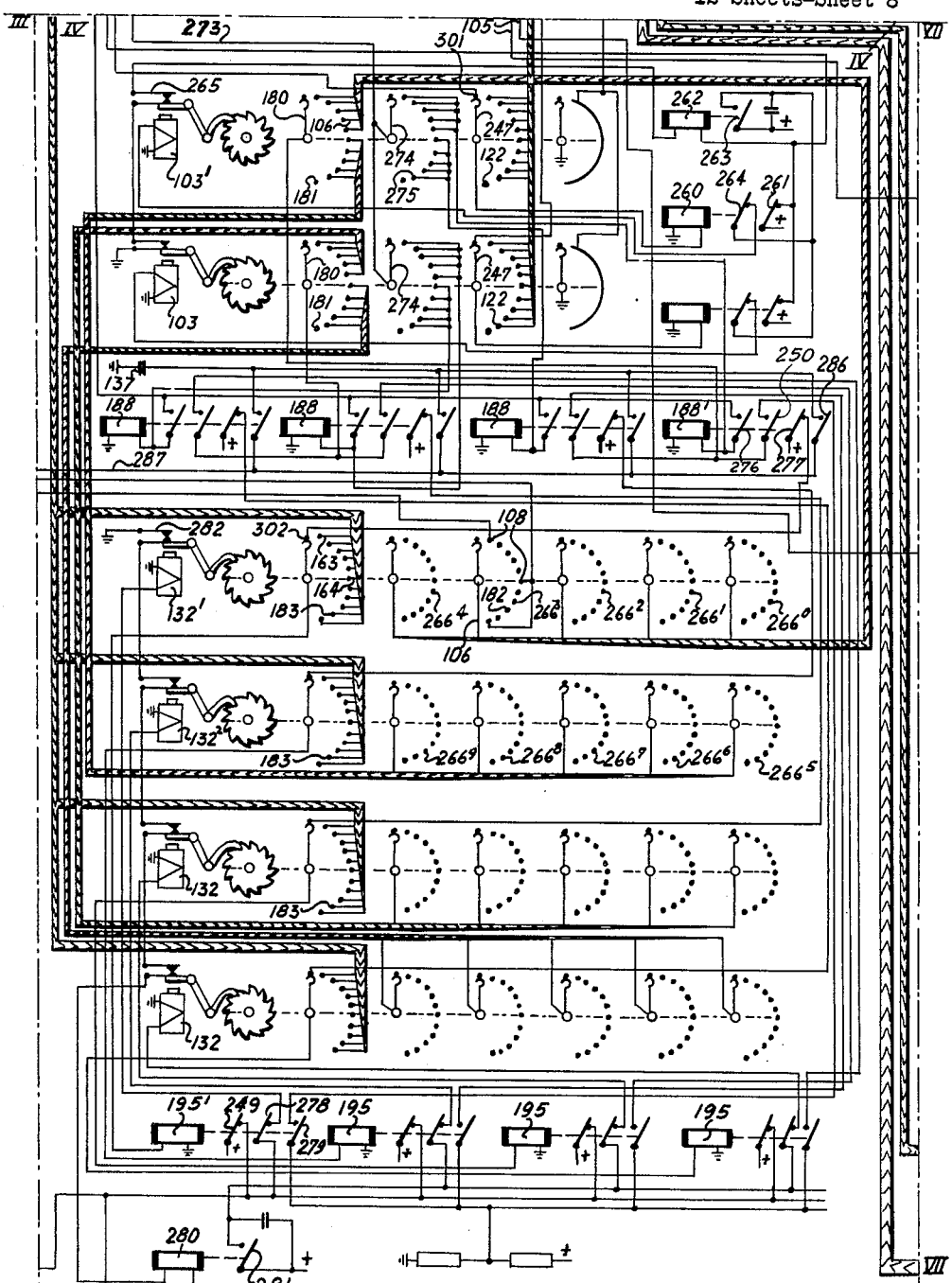
Figure 13:
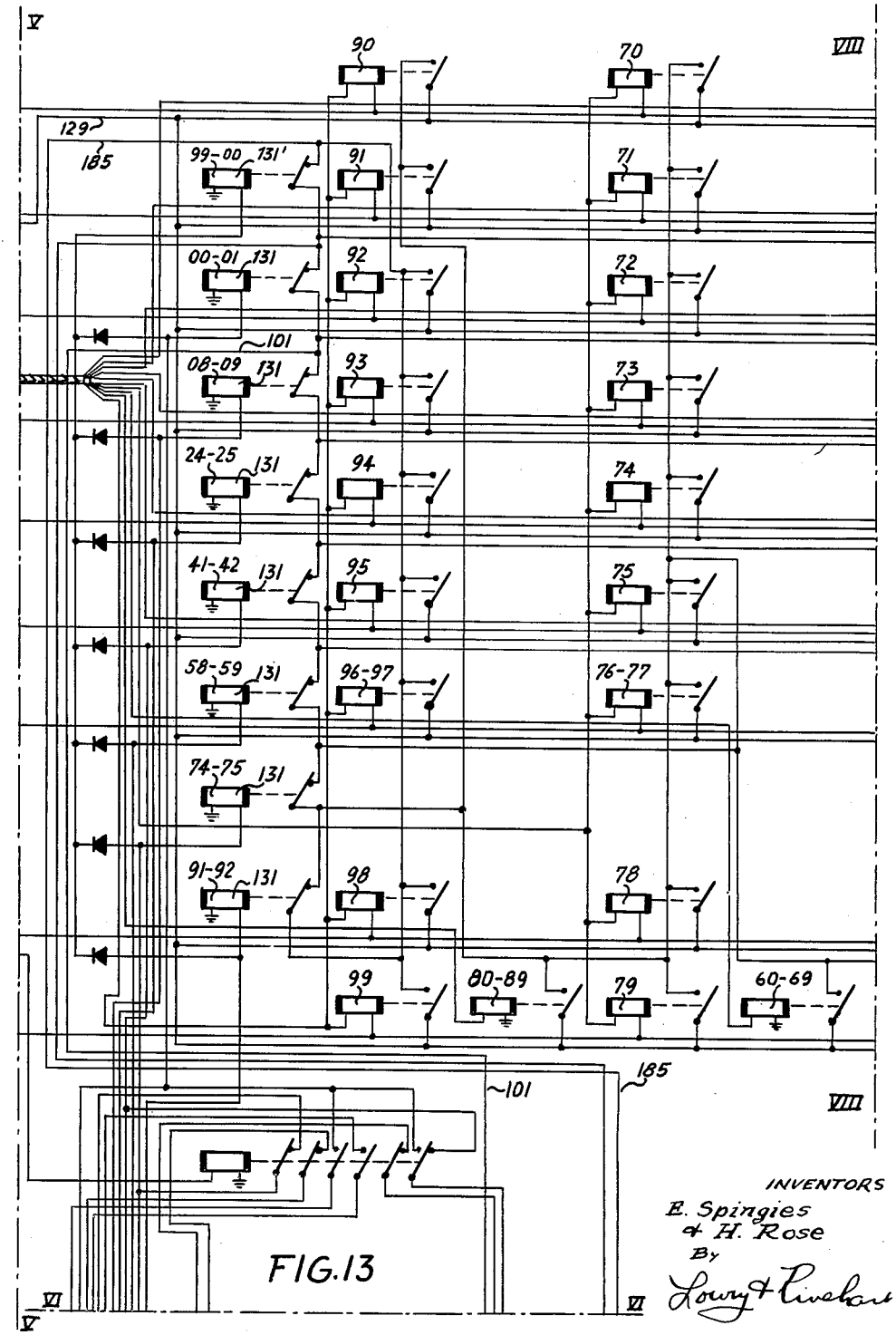
Figure 14:

For determining the desired tax and contribution groups another selector 132 is connected with each of the distribution selectors 103 and in FIG. 12 is divided into two selectors $132^1$ and $132^2$. In the example chosen the selectors $132^1$ and $132^2$ are associated with a distribution selector $103^1$ having a contact path 181.

The selectors $132^1$ and $132^2$ represent the values which are represented in the connecting points 120. These selectors have each 6 contact paths arranged on a common axis and the contact path 183 of which serves for controlling the running in of the selectors. Contact paths 266 represent each a hundreds place of the value run into the input part.

For example:

Contact path $266^0 = 0$ hundred dollars
Contact path $266^1 = 1$ hundred dollars
Contact path $266^2 = 2$ hundred dollars
. . . =. . .
Contact path $266^9 = 9$ hundred dollars Since, as already mentioned, the selectors $132^1$ and $132^2$ are coordinated, via the distribution selector $103^1$, with the switching point 120 for the representation of the dollar amounts from 54 to 56$, the values from 54 to 56$, 154 to 156$, 254 to 256$ . . . up to 954 to 956$ can be represented by these two selectors. The selectors 132 are set in motion by the release of relays $248^1$–$248^{27}$ which are provided for each contribution and wage tax deduction to be recorded. At the same time these relays give the halt signal for the selectors 132 in a certain switching position. In the example, after signalling the contribution group 1, the relay $248^1$ is energized which releases by closing its contact 267 the selector $132^1$.

Via a contact 158 of the relay $248^1$ plus voltage is applied through a circuit 163 to the first contact of the controlling contact path 183 of the selector $132^1$. When the switch arm reaches this contact, a relay $195^1$ is energized and switches off the selector $132^1$. In the present example the selector $132^1$ has made one switching step.

The contact 267 of the relay $248^1$ receives voltage via the contact 271 of the relay 170, via the circuit 272 and applied same through a circuit 273 to switch arms 274 of the distribution selectors 103; in the example, to the turned-in switch arm 274 of the distribution selector 103¹. Appertaining contact paths 275 are connected together to 5 contacts each.

In this example, the switch arm 274 would stand on the fourth contact according to the representation of the amount of 300 dollars. The voltage applied to the contact 267 of the relay 248¹ now continues to pass to a relay 188¹ which responds and holds itself via its contact 276. A contact 277 of the relay 188¹ will be opened and thereby switches off the holding voltage from the first contact of the controlling contact path 183 of the selector 132¹. This causes the relay 195¹ to release which closes its contacts 249 and 278 and opens its contact 279. By closing the contact 249 a relay 280 is energized which closes its contact 281 and applies voltage to the driving magnet of the selector 132¹ via the contact 278 of the relay 195¹. The selector 132¹ makes one switching step and opens its appertaining contact 282 which switches off the minus voltage from the relay 280. The contact 281 will be opened, the driving magnet of the selector 132¹ becomes dead, the armature releases and closes its appertaining contact 282. The relay 280 can be actuated once more and continue to turn the selector by another switching step. The now closed contact 279 of the relay 195¹ applies plus voltage via a contact 250 of the relay 188¹ to a switch arm 180 of the distribution selector 103¹ which stands on the fourth contact according to its setting position mentioned in the example, and transmits the voltage via the circuit 106 to a switch arm 266⁴ of the selector 132¹. Since this selector has made, as described above, a switching step this voltage arrives at the switching point 108.

In the example illustrated only tabular values of four places are shown, that is up to a constant value of $99.99. For this reason only four step-by-step selectors 111 are shown.

As long as one of the selectors is in motion, a relay 135 comprising a check contact 257 is attached via the contact 249 of the relay 195¹, and charges a condenser 137 through a contact 136 associated therewith, a circuit 287 and a contact 286 of the relay 188¹. When the selector 132¹ has ceased to move, the relay 135 drops and transmits the condenser charge to a relay 138 through the contact 136. The relay 138 engages a relay 140 via a contact 139 and at the same time imparts voltage through a circuit 141 to a relay 157, comprising a check contact 258, and via a contact 288 of the plug connection of the output part 104, the signal to the receiver of the connected calculating machine for retrieving the succeeding constant values (table values) as impulses or control voltages, the circuit 141 receiving holding current from the receiver until the receiver of the connected calculating machine has taken over the current impulses or control voltages from the step-by-step selectors 111¹ to 111⁴ through selectively settable switch-over contacts 186 and the closed contacts of relays 144 via the circuits 114 (return signal for receipt of value).

When the relay 140 has responded, the connection via a contact 142 which in its position of rest imparts the holding voltage to contacts 109¹, contact paths 110 of the step-by-step selectors 111¹ to 111⁴, is released so that relays 289 will release and cause contact-breaker relays 290 to respond, whereby the step-by-step selectors 111 start up. At the same time the contact 142 gives up a potential through a circuit 143 to a relay 144 and a relay 192. The relay 192 prepares via its contact 291 for the later-described charging of a condenser 148. This relay is energized only upon the running in of the step-by-step selectors 111 into their value-determining position and prevents the condenser 148 from being charged during the running of the step-by-step selectors 111 into the initial position. The relay 144 effects either the switching of the circuits 114 serving as output circuits via the switch-over contacts 186 on to the circuits of the step-by-step selectors 111 carrying the current impulses or the recovering of control voltages from contact paths 187.

The constant value contacts 109 of the contact paths 110 of each step-by-step selector 111 are connected to the switching point 108 of a contact path 182 of the selector 132¹ run in via diodes 107¹ to 107⁴. In the example described the diode 107¹ is connected to the seventh contact of the step-by-step selector 111¹ (unit cent place), the diode 107² to the first contact of the step-by-step selector 111² (tens cent place), the diode 107³ to the sixth contact 111³ (unit dollar place), and the diode 107⁴ to the fourth contact of the step-by-step selector 111⁴ (tens dollar place). Preferably, the contact paths 110 of the step-by-step selectors 111¹ and 111² and the step-by-step selectors 111³ and 111⁴ are each assembled to one coordinate, as shown in FIG. 5.

The step-by-step selectors 111¹ to 111⁴ set in motion will now run until the switch arms of the contact paths 110 have reached the value-determining contacts 109 and the relays 289 receive voltage so that the contacts thereof which will be opening will stop the running of the step-by-step selectors.

The subscription amount of $46.17 is applied to the output circuit 114 for controlling the connected up calculating machine via the switch arms of the contact paths 187, which stand on the values run in and having the corresponding control voltages, via the contacts 186 and the closed contacts of the relay 144. The subscription amount of $46.17 can be applied to the output circuit 114 also after throwing of the switch-over contacts 186 by the current impulses of the step-by-step selectors 111, running up to these contacts, via contacts of the relay 114.

As long as the step-by-step selectors 111 are in motion a relay 146 is energized via diodes 145 and charges a condenser 148 through a contact 147.

When the step-by-step selectors 111 have ceased to move, the relay 146 drops and gives up the condenser charge via the contact 147 to a relay 149, which is held through a contact 251 and which via a contact 150 transmits a control signal through a circuit 151 for calculating the value in a machine connected therewith. At the same time a relay 152 is energized and charges a condenser 153 through a contact 154. The contact 154 remains in its operative position until control circuit 151 is switched from the machine connected therewith (return signal that the control has been carried out). A relay 156 is then energized via the contact 154 and a circuit 155 and temporarily interrupts the connection between the brushes of the contact paths 110 and the appertaining relays 289, so that the step-by-step selectors 111 continue to run due to the contacts of the released relays 289 until the switch arms of the contact path 110 will reach the contacts 109¹ where they receive voltage from the contact 142 of the relay 140 and cause the relays 289 to respond. Thus the step-by-step selectors 111 have returned into their zero position.

A systematic control is provided to determine whether supplementary subscriptions have to be paid. Such supplementary subscriptions must be additionally deducted in the case of wage amounts exceeding, say, $500.00. As soon as the connected machine has picked up the tabular values transmitted from the constant value transmitter, the circuit 141 becomes dead and the relay 157 drops and releases the holding connection of a contact 158 on the relay 248¹. In its energized position this relay has charged a condenser 160 through a contact 159 and said condenser now causes the relay 248¹² through a circuit 161 to respond. When the relay 248¹ has dropped, a circuit 163 becomes dead. The selector 132¹ continues to move on and is again brought to a standstill via the controlling contact path 183 on the contact connection of a circuit 164, which now receives potential via a contact 184 of the relay 248¹². The procedure of value transmission at this newly selected point 108¹ of the contact path 182 is repeated in a similar manner when additional constant values have to be transmitted, as previously described. In the example in question only the value 0.00 is transmitted, as no additional contribution has to be deducted.

A relay 171, by by-passing the step-by-step selectors 111, sees that the value 0 arrives in the connected machine as an item $0.00 via a control circuit 172. To this end voltage is applied to the holding points 109$^1$ of the contact path 110 via a contact 292, so that the step-by-step selectors 111 cannot start. A contact 293 applies voltage to the circuit 141, so that the relay 140 can pull up and discharge the charge of a condenser 294 to a relay 297 via a contact 295 of the relay 140 and a contact 296 of the relay 171. The relay 297 applies a control impulse to the circuit 172 via its contact 298.

Figure 9:
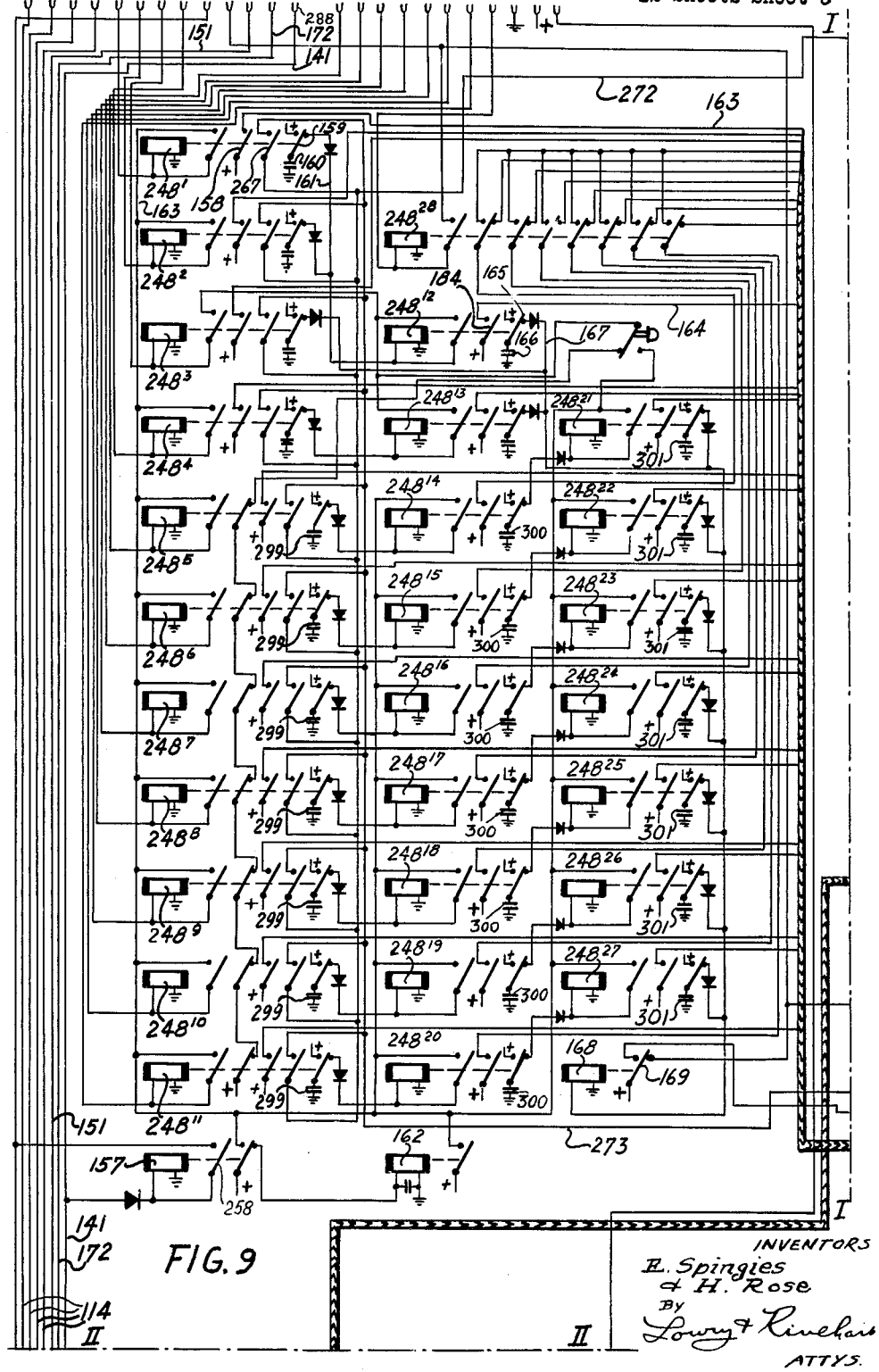

In FIG. 9, the relays 248$^5$ to 248$^{27}$ serve for picking up further deduction values. The relays 248$^5$ to 248$^{11}$ are determined for the selection of tax classes, the relays 248$^{14}$ to 248$^{20}$ for the church taxes coordinated to the tax classes and the relays 248$^{21}$ to 248$^{27}$ for the other tax deductions. Upon signalling a wage tax class by pressing a key in the switched on calculating machine, voltage is applied to one of the relays 248$^5$ to 248$^{11}$, so that same will pull up and, as already described, control the continued running of the selectors 132. After the delivery of the tax amount the selected relay releases and switches on, via its appertaining condenser 299, the corresponding relays 248$^{14}$ to 248$^{20}$ which, in turn, effect the control of the continued running of the selector 132. After the delivery of the church tax value this relay, too, releases and switches on, via its appertaining condenser 300, the relays 248$^{21}$ to 248$^{27}$ for other taxes. These relays, too, control the continued running of the selector 132, as described above. After the delivery of the other taxes a condenser 301 of this relay switches on a relay 168 which effects by its contact 169 that the selectors 245$^5$, 103 and 132 yet run in are brought into their initial position.

The throwing of the contact 169 takes away the holding voltage from the relay 170 which has held itself via its contact 256, so that this relay releases. The contact 253 breaks the connection to the winding of the relay 116 of the selector 245$^5$ so that same starts. This selector runs until the appertaining switch arm 284 reaches the contact 285 and the relays 116 responds and stops the run of the selector. Thus the selector 245$^5$ is brought into its initial position. Upon the continued running of the selector 245$^5$ into the initial position the contact arm 246$^5$ of the selector 245$^5$ also switches off the voltage for the selector 103$^1$, so that the relay 260 releases and causes the selector 103$^1$ to continue running until it has reached its initial position. The relay 260 has received voltage from the positive pole via the contact 133 of the relay 121, and the contact 301 of the contact path 122 and the switch arm 247 and stopped the running of the selector. Therewith the distribution selector 103$^1$ is brought into its initial position.

By the contact 169 of the relay 168 also the holding voltage of the relay 188$^1$ which was able to hold itself via its contact 276, is switched off. The relay releases and applies voltage, via its closed contact 277, to a contact 302 of the controlling contact path 183 of the selector 132$^1$.

Due to the release of the last energized relays 248$^{21}$ to 248$^{27}$ for other taxes the holding voltage from the controlling contact path 183 of the selector 132$^1$ is switched off, so that the latter starts by the release of the relay 195$^1$. After the switch arm of the controlling contact path 183 has reached the contact 302, the relay 195$^1$ receives voltage and stops the selector 132$^1$ in its initial position.

So as to avoid wrong switching while the step-by-step selectors are returning into their zero positions, the control condensers 126, 137, 148, and 190 are switched off the charging voltage.

Relays 189, 191, 192, 193, 194 and 162 serve for checking the proper return movement of the step-by-step selectors into their zero positions.

From the above detailed description of the invention, it is believed that the construction will at once be apparent, and while there are herein shown and described preferred embodiments of the invention, it is nevertheless to be understood that minor changes may be made therein without departing from the spirit and scope of the invention as claimed.

We claim:

1. Information converter apparatus for deriving tabular information corresponding to respective input information, said apparatus comprising stepping input selectors responsive to input information in the form of groups of electrical impulses for selecting appropriate switching points in response to input information, the tabular information output being determined by the particular switching points selected, second selectors connected to the outputs of said input selectors, first relays connected to said second selectors and cooperating therewith to group a plurality of individual items of input information into corresponding categories of input information, first capacitor means connected to said input selectors to energize said second selectors and relays to vary the number of switching points in relation to items of said input information, control relays responsive to said input information for controlling the operation of said second selectors, second capacitor means connected to said control relays to be charged during the operation of said second selectors, means responsive to the cessation of operation of said second selectors to cause said second capacitor means to discharge, and means responsive to the discharge of said second capacitor means for controlling the transmission of the output tabular information.

2. The apparatus defined in claim 1 further comprising safety relays responsive to the incomplete operation of said second selectors and first relays for preventing discharge of said first and second capacitors.

3. The apparatus defined in claim 1 wherein the switching points corresponding to respective items of input information are energized only after said input selectors have reached their appropriate switching positions.

4. The apparatus defined in claim 1 wherein said control relays are connected to operate in groups, and wherein each group of said control relays are automatically operated by the discharge of appropriate capacitor means.

5. Information converter apparatus for deriving tabular information corresponding to input information, said apparatus comprising means for receiving appropriate input information in the form of individual characters, first stepping selector switches responsive to individual characters of said input information to assume switching positions corresponding thereto, a bank of relays, the operation of individual relays of said bank being dependent upon the switching positions assumed by said first selector switches, said relays and said selector switches being so connected as to represent individual groups of output information items for pluralities of input information items, second stepping selector switches responsive to the operations of said relays to assume preselected switching positions corresponding to the groups of output information items represented by said operated relays, the switching positions of said second selectors representing tabular information corresponding to select items of input information, and means for controlling the transmission of electrical energy through said selectors and devices, said controlling means comprising relay means having a first position and a second position, and capacitor means connected to said relay means to be charged in said first position and to be discharged in said second position.

6. The apparatus defined in claim 5 wherein said relay means remains in said first position during the actuation of said selector switches and is placed in said second position by the selection of the appropriate switching position of said selector switches, the discharge of said capacitor means creating a pulse of energy which initiate the operation of successively operating circuits.

References Cited in the file of this patent

UNITED STATES PATENTS

| | | |
|---|---|---|
| 1,881,640 | Johnstone | Oct. 11, 1932 |
| 2,139,079 | Haselton | Dec. 6, 1938 |
| 2,172,078 | Ziguelde | Sept. 5, 1939 |
| 2,178,064 | Bryce | Oct. 31, 1939 |
| 2,195,850 | Cunningham | Apr. 2, 1940 |
| 2,226,692 | Brunner | Dec. 31, 1940 |
| 2,236,822 | Hershey | Apr. 1, 1941 |
| 2,264,563 | Bumstead | Dec. 2, 1941 |
| 2,332,304 | Davies | Oct. 19, 1943 |
| 2,374,537 | Goldsmith | Apr. 24, 1945 |
| 2,477,722 | Coe et al. | Aug. 2, 1949 |
| 2,489,306 | McWhirter et al. | Nov. 29, 1949 |
| 2,663,398 | Skillman | Dec. 22, 1953 |

FOREIGN PATENTS

| | | |
|---|---|---|
| 687,419 | Germany | Jan. 29, 1940 |